US008806211B2

(12) United States Patent
Gassoway

(10) Patent No.: US 8,806,211 B2
(45) Date of Patent: Aug. 12, 2014

(54) METHOD AND SYSTEMS FOR COMPUTER SECURITY

(75) Inventor: Paul Gassoway, Norwood, MA (US)

(73) Assignee: CA, Inc., Islandia, NY (US)

( * ) Notice: Subject to any disclaimer, the term of this patent is extended or adjusted under 35 U.S.C. 154(b) by 3359 days.

(21) Appl. No.: 10/849,318

(22) Filed: May 19, 2004

(65) Prior Publication Data
US 2005/0262565 A1 Nov. 24, 2005

(51) Int. Cl.
H04L 29/06 (2006.01)
G06F 21/55 (2013.01)
G06F 21/56 (2013.01)

(52) U.S. Cl.
CPC .......... G06F 21/554 (2013.01); H04L 63/1441 (2013.01); G06F 21/564 (2013.01)
USPC ........................................................ 713/176

(58) Field of Classification Search
USPC ...................................... 713/176; 726/23, 13
See application file for complete search history.

(56) References Cited

U.S. PATENT DOCUMENTS

| 5,796,942 | A  | * | 8/1998  | Esbensen ........................ 726/13 |
| 5,799,148 | A  | * | 8/1998  | Cuddihy et al. ................ 714/26 |
| 6,279,113 | B1 | * | 8/2001  | Vaidya ............................ 726/23 |
| 7,032,114 | B1 | * | 4/2006  | Moran ........................... 713/187 |
| 7,295,831 | B2 | * | 11/2007 | Coleman et al. .............. 455/410 |
| 2002/0059078 | A1 | * | 5/2002 | Valdes et al. ...................... 705/1 |
| 2003/0009693 | A1 | * | 1/2003 | Brock et al. .................. 713/201 |
| 2003/0061514 | A1 | * | 3/2003 | Bardsley et al. ............... 713/201 |
| 2003/0145226 | A1 |   | 7/2003 | Bruton, III et al. ........... 713/201 |
| 2004/0172557 | A1 | * | 9/2004 | Nakae et al. ................... 713/201 |
| 2004/0172558 | A1 | * | 9/2004 | Callahan et al. ............... 713/201 |
| 2005/0037733 | A1 | * | 2/2005 | Coleman et al. .............. 455/411 |
| 2005/0097339 | A1 | * | 5/2005 | Wiley et al. ................... 713/188 |

OTHER PUBLICATIONS

"Aggregation and Correlation of Intrusion-Detection Alerts," Debar et al., Lecture Notes in Computer Science, Springer Berlin / Heidelberg, vol. 2212/2001, Copyright 2001.*
Notification of Transmittal of the International Search Report and the Written Opinion of the International Searching Authority of International application No. PCT/US2005/017255, filed May 18, 2005 (12 pages).
EPO Communication pursuant to Article 94(3) EPC; Application No. 05 750 054.8-2212; Ref. HCD/J00049170EP.
European Patent Office; Communication Pursuant to Article 94(3) EPC for Application No. 05 750 054.8-2212, Ref. J00049170EP, 4 pages.

* cited by examiner

Primary Examiner — Oscar Louie
(74) Attorney, Agent, or Firm — Baker Botts, LLP

(57) ABSTRACT

Methods and systems for maintaining computer security are provided. The method for maintaining security of a computer system comprises determining an initial system certainty value for the computer system, providing access to a database of signatures, each signature including a signature certainty value, receiving data, comparing the received data with the database of signatures, increasing the system certainty value if the received data does not match a signature in the database, decreasing the system certainty value if the received data matches a signature in the database and filtering the data based on the system certainty value and the signature certainty value of a signature matching the received data.

24 Claims, 5 Drawing Sheets

METHOD AND SYSTEMS FOR COMPUTER SECURITY

BACKGROUND

1. Technical Field

The present disclosure relates generally to security and, more particularly, to a method and system for computer security.

2. Description of the Related Art

With the growth of the Internet, the increased use of computers and the exchange of information between individual users has posed a threat to the security of computers. Computer security attempts to ensure the reliable operation of networking and computing resources and attempts to protect information on the computer or network from unauthorized access or disclosure. Computer system(s) as referred to herein may include(s) individual computers, servers, computing resources, networks, etc. Among the various security threats that present increasingly difficult challenges to the secure operation of computer systems are computer viruses, worms, Trojan horses, etc. These intrusions attempt to compromise system information and/or system resources by deleting files, system settings, etc, or by allowing intruders to modify the files on a system, either unintentionally as a consequence of their intrusion, or in order to further compromise computer security by installing Trojans, password recorders, etc.

Intruders might launch a number of different types of attacks on computer systems, including information gathering attacks, exploits, or denial of service (DoS) attacks, etc. Information gathering attacks allow intruders to perform a number of harmful actions on a computer system, including stealing confidential information such as credit cards, passwords, etc. Exploits allow attackers to make use of vulnerabilities in target servers or misconfigurations on the computer system. For example, web servers and web browsers often have a series of security loopholes. Attackers take advantage of these loopholes by executing attacks such as, buffer overflow attacks. A buffer overflow attack occurs when a program attempts to write more data onto a buffer area in the web server than it can hold. This causes an overwriting of areas of stack memory in the web server. If performed correctly, this allows malicious code to be placed on the web server which would then be executed. Denial of service attacks allow intruders to prohibit users from accessing resources on the computer system. Intruders make the system inaccessible by overloading computer system resources or crashing a service or machine on the computer system, etc.

Users may install firewalls in order to attempt to protect their computer systems from attack. A firewall may include a computer system and/or software system composed of a set of related programs that is placed between a private computer system and a public network (i.e., Internet). A firewall provides security protection to the system by screening incoming requests and preventing unauthorized access. Firewalls operate by working with router programs to determine the next destination to send information packets, ultimately deciding whether or not to forward the packets to that location. Firewalls can also impose internal security measures on users in the system by preventing them from accessing certain materials, such as websites on the World Wide Web, that may have unknown and potentially dangerous security consequences.

However, firewalls do not provide a computer system with comprehensive protection against attacks. Firewalls stop communication and only allow the traffic that a system administrator permits to go through. However, firewalls have no capability of detecting whether or not traffic that is legitimately allowed through is really an attack.

Users may also utilize intrusion detection systems in order to protect their computer systems from attack. Intrusion detection is the process where data is inspected for malicious, inaccurate or irregular activity. Intrusion detection systems may include host based intrusion detection systems and/or network intrusion detection systems. Host based intrusion detection systems (HIDS) monitor and report security lapses for the host on which the system runs by checking log files, users, and the file system. Network intrusion detection systems (NIDS) operate to protect computer systems from foreign intrusions by monitoring all network traffic and logging suspicious behavior. There are two forms of NIDS, pattern matching systems and anomaly based systems. Pattern matching systems inspect each network packet and compare it to prior information about specific attacks compiled in a signature database. If a match is found, an alarm is triggered and the system administrator is notified. Anomaly based systems create a profile of normal network traffic and compare it to the profile of the current network. Any irregular traffic will trigger an alarm and notify the system administrator.

However, conventional intrusion detection systems also do not provide a computer system with comprehensive protection against attacks. The problem with pattern matching NIDS is that the signature database needs to be continuously updated in order to detect new and modified intrusions. This not only proves to be a very tedious and time consuming task but also doesn't happen often enough to provide adequate safeguards against foreign intrusions. Furthermore, pattern matching NIDS may detect and block a large number of packets, even though those packets may not be malicious. A problem with anomaly based NIDS is that as networks grow, it becomes hard to create a profile of normal network traffic. Hackers may even generate their own traffic in order to distort the profile of normal network traffic and get past the intrusion detection system. In either type of system, if the intrusion detection system narrowly characterizes "normal", then the system may generate a large amount of false positives, increasing the monitoring burden on users which may cause users to ultimately ignore the intrusion detection system.

Accordingly, a need exists for techniques that overcome the disadvantages of conventional methods of security protection. It would be beneficial to have methods and systems for preventing security breaches altogether and ensuring that exploitation of system vulnerabilities will never come to light.

SUMMARY

A method for maintaining security of a computer system comprises determining an initial system certainty value for the computer system, providing access to a database of signatures, each signature including a signature certainty value, receiving data, comparing the received data with the database of signatures, increasing the system certainty value if the received data does not match a signature in the database, decreasing the system certainty value if the received data matches a signature in the database and filtering the data based on the system certainty value and the signature certainty value of a signature matching the received data.

A system for maintaining computer security comprises means for determining an initial system certainty value for the computer system, means for providing access to a database of signatures, each signature including a signature certainty value, means for receiving data, means for comparing the received data with the database of signatures, means for increasing the system certainty value if the received data does not match a signature in the database, means for decreasing the system certainty value if the received data matches a signature in the database and means for filtering the data based on the system certainty value and the signature certainty value of a signature matching the received data.

A computer recording medium including computer executable code for maintaining security of a computer system, comprises code for determining an initial system certainty value for the computer system, code for providing access to a database of signatures, each signature including a signature certainty value, code for receiving data, code for comparing the received data with the database of signatures, code for increasing the system certainty value if the received data does not match a signature in the database, code for decreasing the system certainty value if the received data matches a signature in the database and code for filtering the data based on the system certainty value and the signature certainty value of a signature matching the received data.

BRIEF DESCRIPTION OF THE DRAWINGS

A mote complete appreciation of the present disclosure and many of the attendant advantages thereof will be readily obtained as the same becomes better understood by reference to the following detailed description when considered in connection with the accompanying drawings, wherein.

DETAILED DESCRIPTION

This application provides tools (in the form of methodologies, apparatuses, and systems) for maintaining computer security. The tools may be embodied in one or more computer programs stored on a computer readable medium or program storage device and/or transmitted via a computer network or other transmission medium.

The following exemplary embodiments are set forth to aid in an understanding of the subject matter of this disclosure, but are not intended, and should not be construed, to limit in any way the invention as set forth in the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

The specific embodiments described herein are illustrative, and many variations can be introduced on these embodiments without departing from the spirit of the disclosure or from the scope of the appended claims. Elements and/or features of different illustrative embodiments may be combined with each other and/or substituted for each other within the scope of this disclosure and appended claims.

Figure 1:
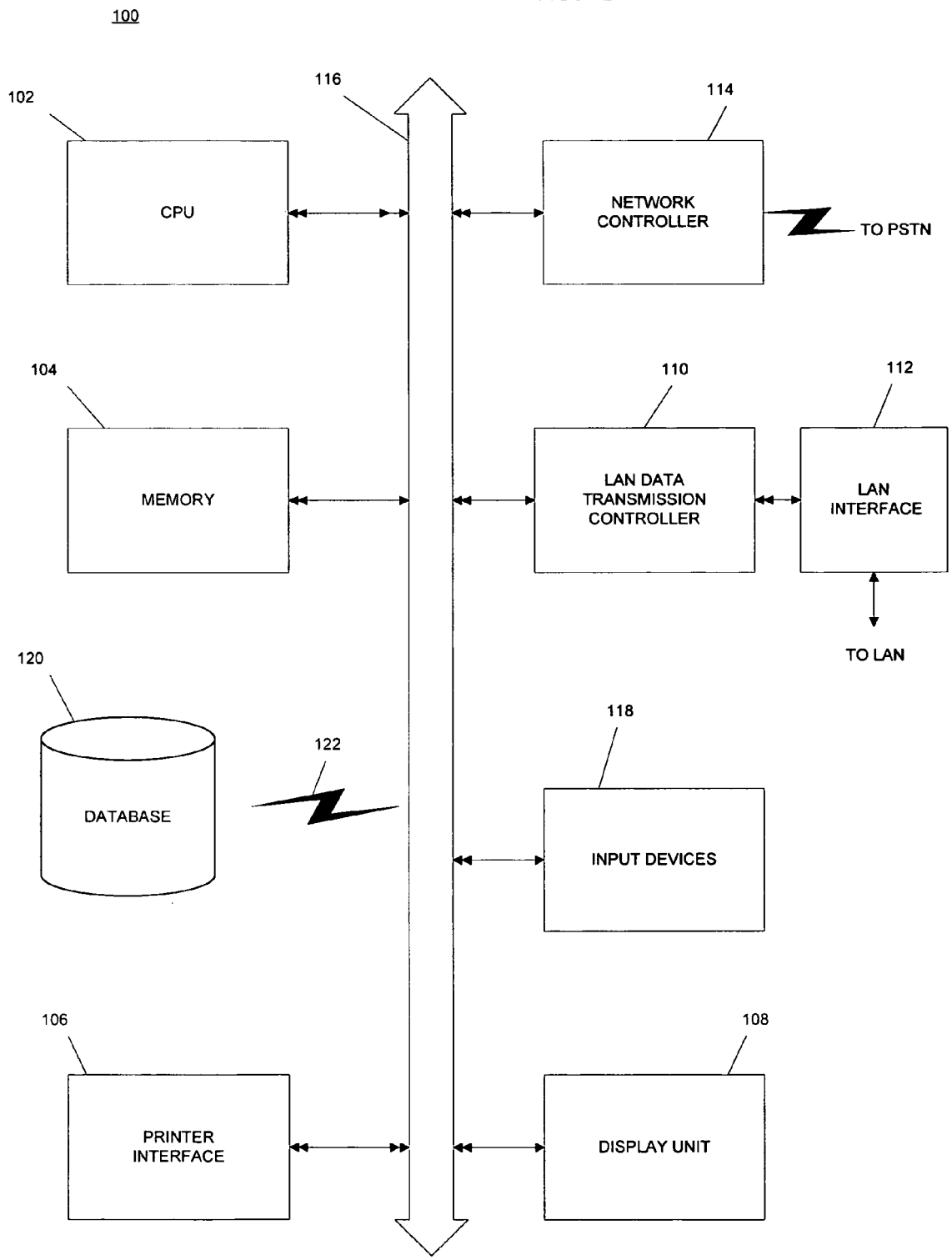
FIG. 1 shows a block diagram of an exemplary computer system capable of implementing embodiments of the present disclosure.

FIG. 1 shows an example of a computer system 100 which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 may be connected to a database 120, via a link 122.

Attacks against a computer system often involve a large number of penetration attempts and/or probing before the attack succeeds in infiltrating the system. According to an embodiment of the present disclosure, as the present system receives more suspicious traffic, it is more likely to block the suspicious activity while still allowing normal traffic to pass through.

Figure 2:
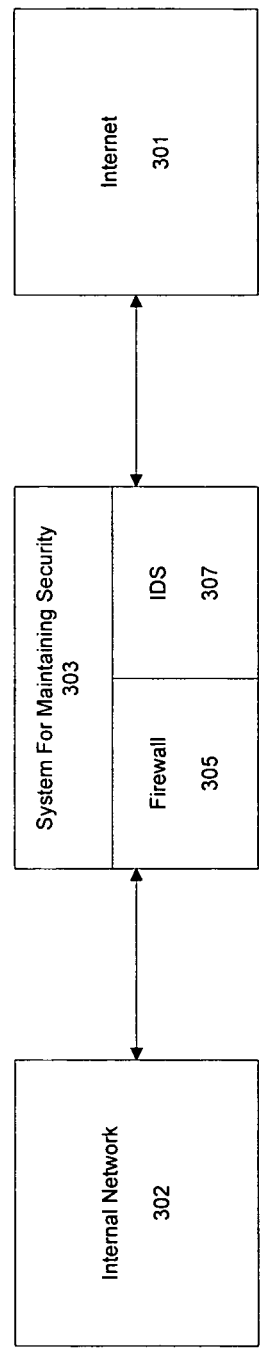
FIG. 2 shows a block diagram illustrating the relationship between the system of the present application and the computer systems it is connected to, according to embodiments of the present disclosure.

FIG. 2 is a block diagram for describing various aspects of embodiments of the present disclosure. A system for maintaining computer security 303 resides between two networks. For example, according to this embodiment, system 303 resides between the Internet 301 and an internal network 302. Of course, system 303 may also reside between two or more internal networks and/or the internet. System 303 passes data back and forth between the Internet 301 and the internal network 302. In this way, system 303 can selectively prevent data from entering and/or leaving the internal network 302.

According to an embodiment of the present disclosure, system 303 includes an intrusion protection system combining a firewall 305 and an intrusion detection system (IDS) 307. IDS 307 uses signatures to determine whether packets may be malicious. Each of the IDS signatures has a certainty level associated with it. System 303 also has a certainty level associated with it. If a packet is found that matches a signature and the certainty level of the matched signature exceeds the certainty level of system 303, system 303 blocks or discards the packet. Attacks often begin with suspicious activity as the attacker probes the network for vulnerabilities. As system 303 receives more suspicious activity, it reduces its certainty level, so that it is more likely to block the actual attack when it occurs.

The certainty level of the signatures may be determined using a number of factors, including precision of the signature, length of the signature, and/or developer assigned value, etc. For example, a relatively lengthy precise signature will have a higher level of certainty than a shorter imprecise signature. In the alternative, each signature may be assigned the same certainty level. The certainty level of the system 303 (system certainty level) acts as a variable threshold and is based upon the amount of matching traffic that the system has encountered before. For example, the more packets having a matching signature that system 303 encounters, the lower the system certainty level is. When a packet matches a signature, and the signature's certainty level exceeds the system's certainty level, the system blocks the packet.

Figure 3:
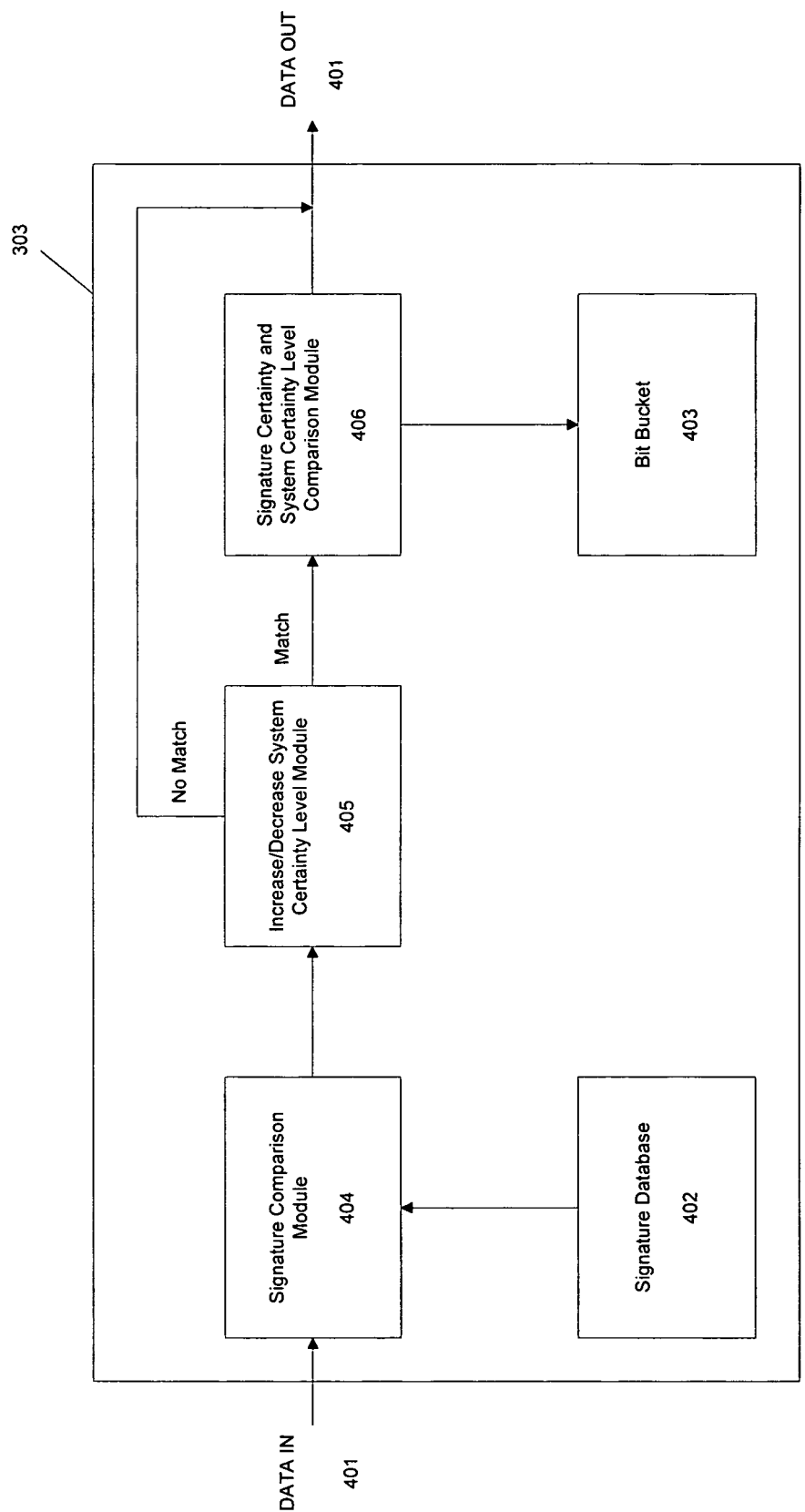
FIG. 3 and FIG. 4 are a block diagram and a flowchart, respectively, showing a system and method for maintaining computer security according to an embodiment of the present disclosure.
Figure 4:
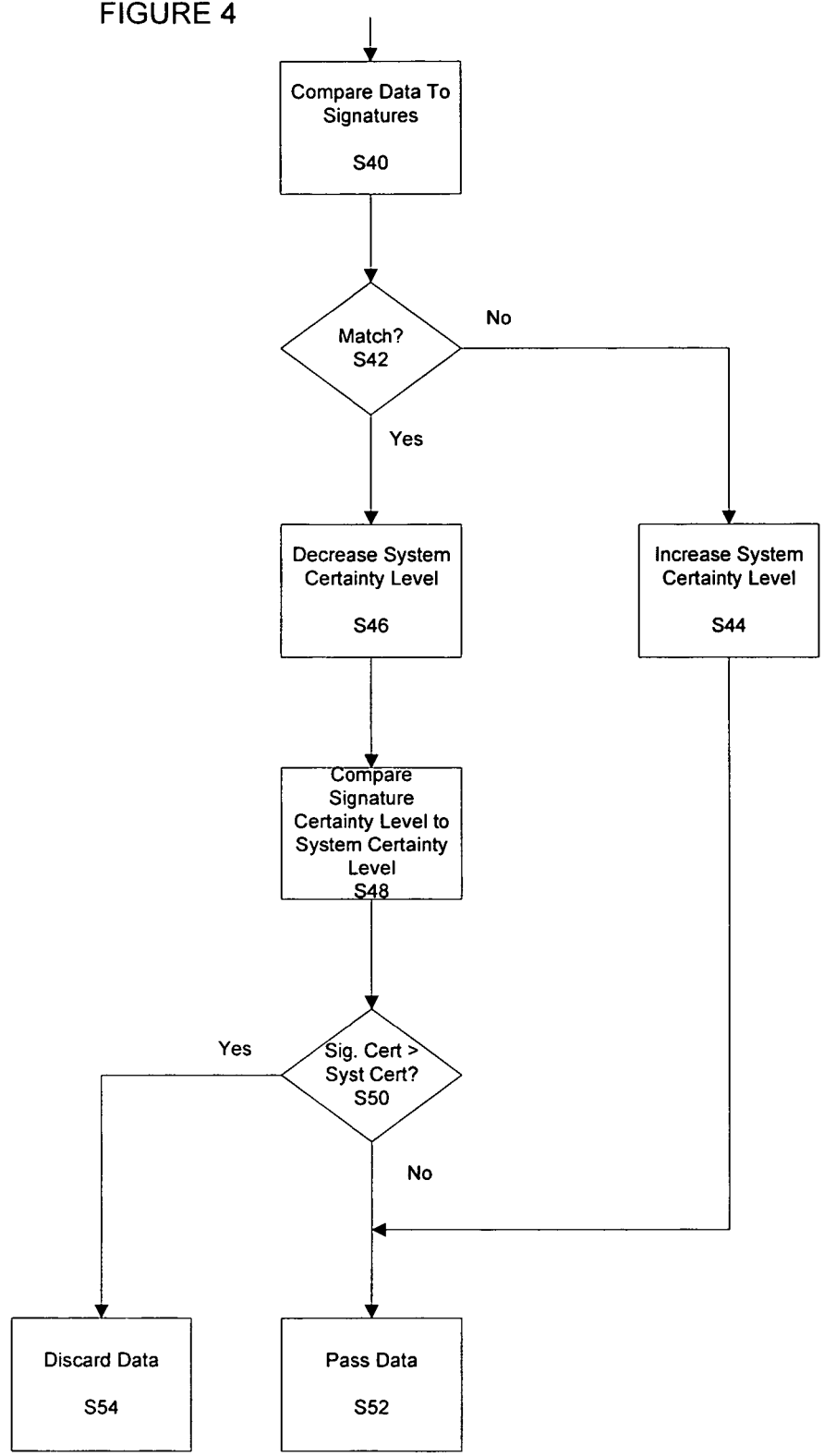

FIG. 3 is a block diagram and FIG. 4 is a flow chart illustrating a system and method for maintaining computer security, according to an embodiment of the present disclosure. System 303 includes a database 402 of signatures of known malicious data. As described above, each signature in the signature database 402 is assigned a signature certainty level. Database 402 my be included in system 303 or may be remote from and accessible by system 303. The data 401 is received and compared with the signatures (Step S40) located in signature database 402 by signature comparison module 404. According to an embodiment of the present disclosure, the data 401 may be packets of data. If the data 401 does not match a signature found in the signature database 402 (No, Step S42), then the certainty level of the system 303 is increased (Step S44) by incrementing/decrementing system certainty level module 405 and the data 401 is forwarded on.

If a match is found in the signature database 402 (Yes, Step S42), then the certainty level of the system 303 is decreased (Step S43) by module 405. The signature certainty level of the matching signature is then compared to the system certainty level (Step S48) by signal certainty and system certainty level comparison module 406. If the signature certainty level is greater than the system certainty level (Yes, Step S50), then the data 401 is discarded. For example, the data may be discarded to a bit bucket 403. However, if after decreasing the system certainty level, the signature certainty level is not greater than the signature certainty (No, Step S50), then the data 401 is forwarded on. A log may be kept to keep a record of data that was forwarded that matched a signature. Information may also be sent to the destination of the packet indicating that the packet matched a signature and may possibly be malicious. Each time the system tests subsequent data, the increased or decreased system certainty level set by the previous data becomes the new system certainty level. Thus, the more suspicious activity the system receives, the more the system certainty level will be reduced, and the more likely it is that the attack will be blocked when it finally arrives. If the traffic does not appear suspicious, then the system certainty will increase and the system will become more permissive. Accordingly, the present system and method provides a greater likelihood of preventing an attack, while decreasing the probability that legitimate traffic will be blocked.

The system certainty level may be adjusted using various formulas. For example, a formula which increases in value as more non-matching data is received, and decreases in value as matching data is received would be suitable. An example of a formula for determining the certainty level is:

$$\text{bytes\_of\_non\_matching\_data\_received} / \text{bytes\_of\_matching\_data\_received} \quad (1)$$

As each packet is found to not match any signature, the number of bytes in the packet is added to bytes_of_non_matching_data_received. For each packet that is found to match a signature, the number of bytes in its packet is added to bytes_of_matching_data_received. Accordingly, as matching data is received, the certainty level goes down, and as non-matching data is received, the certainty level goes up. Of course, variations of the above-noted formula may be used. For example, the maximum and/or minimum certainty levels may be bounded to some value, the bytes_of_non_matching_data_received or byted_of_matching_data_received may be multiplied by some constant, the packet count may be added instead of the byte count, etc.

Figure 5:
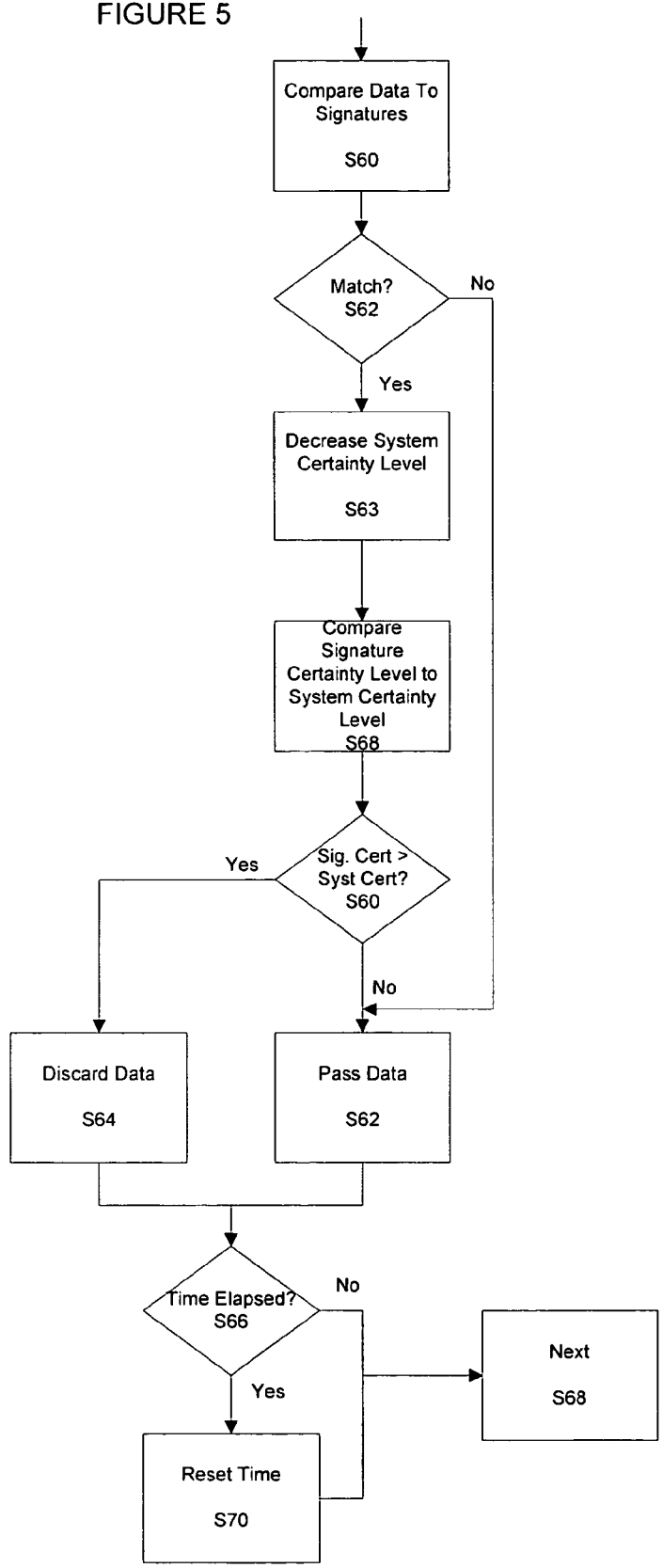
FIG. 5 shows a flowchart illustrating a method for maintaining computer security, according to another embodiment of the present disclosure.

Another embodiment of the present disclosure will be described by reference to FIG. 5, which is a flow chart of a method for maintaining computer security according to another embodiment of the present disclosure. According to this embodiment, instead of increasing the system certainty level each time it is determined that the data does not match a signature in the database, the system certainty level is periodically set to its initial value after a predetermined amount of time has elapsed. For example, the system certainty level may be a fixed value or may be set by presenting a user with a graphic user interface (GUI) prompting the user to set the initial system certainty level. If a user is aware that a particular type of malicious code has been introduced to the internet, the user can set the system certainty level to a low system certainty level, thus making the system less permissive and more likely to catch and prevent an attack. An elapsed time clock is started to keep track of the elapsed time from when the system is started. The incoming data (e.g., data packet) is received and compared with the signatures in database (Step S60). If the data does not match a signature found in the signature database (No, Step S62), the data is allowed to pass. If a match is found in the signature database 402 (Yes, Step S62), then the certainty level of the system 303 is decreased (Step S63). The signature certainty level is then compared to the system certainty level (Step S68). If the signature certainty level is greater than the system certainty level (Yes, Step S60), then the data 401 is discarded (Step S64). For example, the data may be discarded to a bit bucket. If after decreasing the system certainty level, the signature certainty level is not greater than the signature certainty (No, Step S60), then the data 401 is forwarded on (Step S62). After the data is discarded or passed, the system then determines whether a predetermined time has elapsed (Step S66). If the predetermined time has not elapsed (No, Step S66), no action is taken. The system then waits for the next packet of data (Step S68). If a predetermined time has elapsed (Yes, Step S66), the system certainty level is reset to its initial value (Step S70), the elapsed time is restarted and the system waits for the next packet of data (Step S68).

Each time the system tests subsequent data, the decreased system certainty level set by the previous data becomes the new system certainty level. The more suspicious activity the system receives, the more the system certainty level will be reduced, and the more likely it is that the attack will be blocked when it finally arrives. If some suspicious traffic has occurred, but not enough has occurred within the predetermined amount of time, it is likely that an attack will not occur shortly and the system certainty will be reset to its initial value and the system will again become more permissive. Accordingly, the present system and method provides a greater likelihood of preventing an attack, while decreasing the probability that legitimate traffic will be blocked.

Numerous additional modifications and variations of the present disclosure are possible in view of the above-teachings. It is therefore to be understood that within the scope of the appended claims, the present disclosure may be practiced other than as specifically described herein.

What is claimed is:

1. A computer-implemented method for maintaining security of a computer system, the computer comprising a memory and a central processing unit, comprising:

determining an initial system certainty value for the computer system;

providing access to a database of signatures, each signature including a signature certainty value;

receiving data;

comparing the received data with the database of signatures;

increasing the system certainty value if the received data does not match a signature in the database;

decreasing the system certainty value if the received data matches a signature in the database; and filtering the data based on the system certainty value and the signature certainty value of a signature matching the received data.

2. The method of claim 1, wherein the data that does not match a signature in the database is forwarded to its destination.

3. The method of claim 1, wherein the increased or decreased certainty value becomes the initial system value.

4. The method of claim 1, wherein the data comprises a packet of data.

5. The method of claim 1, wherein the filtering further comprises forwarding the data if the signature certainty value is less than the system certainty value; and discarding the data if the signature certainty value is greater than the system certainty value.

6. The method of claim 5, wherein the step of forwarding further comprises generating a message log to indicate that data matching a signature was forwarded.

7. A system for maintaining computer security, comprising:
   means for determining an initial system certainty value for the computer system;
   means for providing access to a database of signatures, each signature including a signature certainty value;
   means for receiving data;
   means for comparing the received data with the database of signatures;
   means for increasing the system certainty value if the received data does not match a signature in the database;
   means for decreasing the system certainty value if the received data matches a signature in the database; and
   means for filtering the data based on the system certainty value and the signature certainty value of a signature matching the received data.

8. The system of claim 7, wherein the data that does not match a signature in the database is forwarded to its destination.

9. The system of claim 7, wherein the increased or decreased certainty value becomes the initial system value.

10. The system of claim 7, wherein the data comprises a packet of data.

11. The system of claim 7, wherein the means for filtering further comprises means for forwarding the data if the signature certainty value is less than the system certainty value; and discarding the data if the signature certainty value is greater than the system certainty value.

12. The system of claim 11, wherein the means for forwarding further comprises means for generating a message log to indicate that data matching a signature was forwarded.

13. A computer recording medium including computer executable code for maintaining security of a computer system, comprising:
   code for determining an initial system certainty value for the computer system;
   code for providing access to a database of signatures, each signature including a signature certainty value;
   code for receiving data;
   code for comparing the received data with the database of signatures;
   code for increasing the system certainty value if the received data does not match a signature in the database;
   code for decreasing the system certainty value if the received data matches a signature in the database; and
   code for filtering the data based on the system certainty value and the signature certainty value of a signature matching the received data.

14. The computer recording medium of claim 13, wherein the data that does not match a signature in the database is forwarded to its destination.

15. The computer recording medium of claim 13, wherein the increased or decreased certainty value becomes the initial system value.

16. The computer recording medium of claim 13, wherein the data comprises a packet of data.

17. The computer recording medium of claim 13, wherein the code for filtering further comprises code for forwarding the data if the signature certainty value is less than the system certainty value; and discarding the data if the signature certainty value is greater than the system certainty value.

18. The computer recording medium of claim 17, wherein the code for forwarding further comprises code for generating a message log to indicate that data matching a signature was forwarded.

19. A system for maintaining computer security, comprising:
   a computer comprising a memory and a central processing unit, the computer being operable to:
      determine an initial system certainty value for the computer system;
      provide access to a database of signatures, each signature including a signature certainty value;
      receive data;
      compare the received data with the database of signatures;
      increase the system certainty value if the received data does not match a signature in the database;
      decrease the system certainty value if the received data matches a signature in the database; and
      filter the received data based on the system certainty value and the signature certainty value of a signature matching the received data.

20. The system of claim 19, wherein if the received data does not match a signature in the database, the received data is forwarded to an intended destination.

21. The system of claim 19, wherein the increased or decreased system certainty value becomes the initial system certainty value.

22. The system of claim 19, wherein the data comprises a packet of data.

23. The system of claim 19, wherein the computer is further operable to:
   forward the received data if the signature certainty value is less than the system certainty value; and
   discard the received data if the signature certainty value is greater than the system certainty value.

24. The system of claim 23, wherein the computer is further operable to generate a message log to indicate that received data matching a signature was forwarded.

* * * * *